(12) United States Patent
Raiser et al.

(10) Patent No.: US 6,764,782 B2
(45) Date of Patent: Jul. 20, 2004

(54) ELECTRICAL ISOLATION SYSTEM FOR A FUEL CELL STACK AND METHOD OF OPERATING A FUEL CELL STACK

(75) Inventors: Stephen Raiser, Egelsbach (DE); Hartmut Hinz, Kronberg (DE)

(73) Assignee: General Motors Corporation, Detroit, MI (US)

( * ) Notice: Subject to any disclaimer, the term of this patent is extended or adjusted under 35 U.S.C. 154(b) by 200 days.

(21) Appl. No.: 10/074,883

(22) Filed: Feb. 13, 2002

(65) Prior Publication Data

US 2002/0192521 A1 Dec. 19, 2002

(30) Foreign Application Priority Data

Jun. 14, 2001 (DE) .......................................... 101 28 504
Jun. 15, 2001 (DE) .......................................... 101 28 836

(51) Int. Cl.[7] .............................................. H01M 8/04
(52) U.S. Cl. ............................. 429/13; 429/22; 429/26
(58) Field of Search ............................. 429/13, 22, 23, 429/26

(56) References Cited

U.S. PATENT DOCUMENTS 3,868,566 A    2/1975  Parsons et al. ................ 324/51
3,969,145 A *  7/1976  Grevstad et al. ............... 429/26
5,082,753 A *  1/1992  Shimizu et al. ................ 429/26
6,582,840 B2 * 6/2003  Hortop .......................... 429/13

FOREIGN PATENT DOCUMENTS

DE    19503749       4/1996   ............ B60L/3/04
DE    19950008       4/2001   ............ H01M/8/04
JP    2000-058079  * 2/2000   ............ H01M/8/04

* cited by examiner

*Primary Examiner*—Stephen J. Kalafut
(74) *Attorney, Agent, or Firm*—Cary W. Brooks

(57) ABSTRACT

An electrical isolation system is provided for a fuel cell stack as well as a method of operating the fuel cell stack. The stack comprises a plurality of fuel cells connected in series and a coolant circuit for cooling said fuel cells in operation using a liquid coolant having a restricted electrical conductivity. The stack is associated with a chassis having a chassis ground and comprising a plurality of coolant passages for said fuel cells. The coolant circuit comprises a plurality of conductive components such as an outer boundary wall of the fuel cell stack, a radiator and/or a pump at least one of which is connected to said chassis ground. A measuring circuit is provided for measuring the resistance between a selected one of the fuel cells and the chassis ground and a monitoring circuit provides a warning signal, or disengages the connection to the output terminals of the stack or shuts down the stack if the resistance reaches a critical value.

26 Claims, 5 Drawing Sheets

ELECTRICAL ISOLATION SYSTEM FOR A FUEL CELL STACK AND METHOD OF OPERATING A FUEL CELL STACK

TECHNICAL FIELD

The present invention relates to an electrical isolation system for a fuel cell stack and to a method of operating a fuel cell stack.

BACKGROUND OF THE INVENTION

Fuel cell stacks comprise a plurality of fuel cells connected in series and/or in parallel. There are many different designs of fuel cells, some of which operate at extremely high temperatures and others of which operate at relatively low temperatures. Fuel cells, which operate at relatively low temperatures, tend to be preferred for use as power plants in vehicles. There are various types of low temperature fuel cells. One frequently used type of fuel cell for vehicle applications is the so-called PEM fuel cell (Proton Exchange Membrane). In a fuel cell of this kind, an anode electrode and a cathode electrode both coated with catalyst material are separated by a synthetic membrane and the assembly comprising the two electrodes separated by the membrane, frequently called an MEA (membrane electrode assembly) is enclosed between two conductive plates referred to as bipolar plates. In a fuel cell stack a plurality of fuel cells are arranged side by side so that each bipolar plate (apart from the end plates of the stack) is associated with two adjacent fuel cells. The bipolar plates are provided at their sides facing the electrodes with passages or channels which enable hydrogen to be fed to the anode electrode of one fuel cell and oxygen in the form of air to be fed to the cathode electrode of a neighboring fuel cell. When the fuel cell is in operation the protons delivered by the hydrogen migrate through the membrane and combine with the oxygen to form water and generate electricity. When a plurality of fuel cells are arranged in a stack, the bipolar plates serve as a separator between adjacent fuel cells, that is to say the bipolar plate has at one side passages for directing hydrogen to the anode of one fuel cell and at the other side passages for directing air to the cathode of an adjacent fuel cell and keeps these gas flows separated.

In the operation of such fuel cells, heat is generated and provision is made for cooling the fuel cells. This cooling is effected by incorporating cooling passages into the bipolar plates through which a coolant flows. Thus, the bipolar plates have a separating function in that they separate adjacent fuel cells. At the same time, they are connected together electrically, in series and/or in parallel, in order to connect them into a power circuit by which the electricity generated by the fuel cell can be extracted. A typical PEM cell produces an output voltage of about 0.9 V. In a typical fuel cell stack there are a sufficient number of fuel cells to produce a relatively high operating voltage, typically in the range from 100 to 400 V. Fuel cells with high operating voltages are the subject of stringent safety requirements, particularly when liquid coolants are used to cool the fuel cell stack. Previous attempts to meet these requirements have focused on trying to achieve complete isolation of the coolant circuit involving radiators, pumps, tubes as well as complete isolation of the fuel cell stack itself. Attempts have also been made to use non-conductive liquids as the coolant, which is intended to prevent dangerous voltage levels at the fuel cell stack being transmitted by the coolant to the radiator and other components which would prevent a serious safety hazard.

The electrical isolation of large components, such as radiators, is however not very practical in a vehicle or in any other system due to size constraints and problems associated with the blocking of cooling air. The use of non-conductive coolants (for example oil) has significant disadvantages because the physical properties of such coolants, such as heat capacity, heat conductivity, and viscosity, are restricted. Moreover, such non-conductive coolants pose an environmental problem since there is always the danger of leakage, for example if connections fail or in the event of accident damage Moreover, there are particular problems in operating such coolants at low temperatures. Such disadvantageous properties adversely affect the system power density the radiator size and the power required to drive radiator fans and coolant pumps.

Because of these disadvantages attention has been paid to using water plus anti-freeze based coolants for liquid cooling. However, it is important to use a coolant with a relatively low conductivity. As explained above the bipolar plates of the fuel cells of the fuel cell stack are connected electrically in series and/or parallel and the liquid coolant flows in parallel through the bipolar plates. Thus, if the liquid coolant is conductive it effectively represents a ground fault of the bipolar plates, which is clearly undesirable.

Liquid coolants are available with a relatively low conductivity favorable for use in fuel cells. However, there is always the danger, in the practical use of a fuel cell system, that someone could add the wrong coolant to the system. The liquid coolants used in fuel cell stacks are also critical from the point of view that they must be designed to avoid corrosive and electrolytic effects, which could lead to long-term deterioration of the fuel cell stack.

Moreover, it is known that liquid coolants deteriorate in use over a longer period of time.

In addition to the aforementioned problems there is also a general problem with fuel cell stacks in as much as faults can occur which lead to a deterioration or failure of the isolation of the fuel cell stack, which could lead to dangerous situations. Such dangerous situations could be particularly acute if the vehicle has been involved in an accident or if some other malfunction has taken place which impairs the quality of the isolation.

SUMMARY OF THE INVENTION

In view of the above mentioned problems, it is an object of the present invention to provide an electrical isolation system for a fuel cell stack and a method of operating a fuel cell stack such that the quality of the electrical isolation can be continuously monitored and such that safety measures can be taken in the event of faulty isolation to prevent damage to the fuel cell stack and associated components and to prevent dangerous situations due to inadequate electrical isolation.

Moreover, it is a further object of the present invention to make available an electrical isolation system and a method of the above named kind which can be implemented at relatively low cost and which operates reliably.

It is a yet further object of the present invention to provide an electrical isolation system and a method of the above named kind which enables a realistic approach to be taken to considerations such as deterioration of the liquid coolant which necessarily occurs over a period of time, with it being possible to ensure the liquid coolant is changed on time before deterioration has reached a critical level.

In order to satisfy these objects there is provided, in accordance with the present invention, an electrical isolation system for a fuel cell stack comprising a plurality of fuel cells connected in series and a coolant circuit for cooling said fuel cells in operation using a liquid coolant having a restricted electrical conductivity, said fuel cell stack being associated with a chassis having a chassis ground and comprising a plurality of coolant passages for said fuel cells, said coolant passages being connected in parallel and/or in series and said coolant circuit comprising an inlet for feeding said liquid coolant into said stack and into said coolant passages, an outlet for removing said liquid coolant from said stack after flow through said coolant passages, a radiator provided as a heat exchanger to cool said liquid coolant and having an inlet and an outlet, a first coolant flow line connecting said radiator outlet to said fuel cell stack inlet, a second coolant flow line connecting said stack outlet to said radiator inlet and a pump for circulating liquid coolant in said coolant circuit, wherein said coolant circuit comprises a plurality of conductive components such as an outer boundary wall of said fuel cell stack, said radiator and/or said pump, wherein at least one of said conductive components is connected to said chassis ground and wherein a measuring circuit is provided for measuring the resistance between a selected one of said fuel cells and said chassis ground.

The outer boundary wall of the fuel cell stack may, for example, be a wall of a metallic housing surrounding the stack, or a metal panel or structure of a vehicle adjacent to the stack or an end plate or side wall of the stack itself.

Also there is provided a method of monitoring a fuel cell stack comprising a plurality of fuel cells connected in series and a coolant circuit for cooling such fuel cells in operation using a liquid coolant having a restricted electrical conductivity, said fuel cell stack having an associated electrical output system, at least one output terminal and a contactor for connecting each said output terminal to said electrical output system and being associated with a chassis having a chassis ground, said fuel cell stack further comprising a plurality of coolant passages for said fuel cells, said coolant passages being connected in parallel and/or in series and said coolant circuit comprising an inlet for feeding said liquid coolant into said stack and into said coolant passages, an outlet for removing said liquid coolant from said stack after flow through said coolant passages, a radiator provided as a heat exchanger to cool said liquid coolant and having an inlet and an outlet, a first coolant flow line connecting said radiator outlet to said fuel cell stack inlet, a second coolant flow line connecting said stack outlet to said radiator inlet and a pump for circulating liquid coolant in said coolant circuit, wherein said coolant circuit comprises a plurality of conductive components such as an outer boundary wall of said fuel cell stack, said radiator and/or said pump, where at least one of said conductive components is connected to said chassis ground, the method comprising the steps of measuring a resistance between a selected one of said fuel cells and said chassis ground and effecting a comparison, directly or indirectly, between said measured resistance and at least one threshold value and, in the event of an unfavorable comparison, generating a warning signal and/or disengaging any contactor connecting a said output terminal of said stack to said electrical system and/or shutting down said fuel cell stack.

Whenever reference is made in this specification and claims to items in the singular, such as "a radiator", "a pump", "a contactor" etc. it will be understood to mean one or more such items.

The concept underlying the present invention is thus first of all the selection of a lay-out of the fuel cell stack and of the associated electrical system which makes it possible to relate changes in resistance to changes in the quality of the electrical isolation of the fuel cell stack and of the associated system and which also makes it possible to analyze the reasons for the change in electrical resistance and thus to take appropriate remedial action (warning and/or disconnection and/or shut down).

For example, a gradual change in the measured resistance can be associated with a gradual deterioration of the coolant and can lead to a warning signal being given when the coolant needs changing. If the deterioration is about to reach a critical level then the fuel cell stack can be automatically shut down.

If a sudden change in resistance occurs then this can be due to a number of reasons. For example the vehicle may have had an accident or even just a slight bump which has led to a ground fault within the fuel cell stack or within the electrical system which can lead to a characteristic change of the measured resistance.

Equally, if an object inadvertently comes into contact with a part of the fuel cell stack or associated coolant system or the associated electrical system which should be insulated from contact, but is inadequately insulated for whatever reason, for example because a cover has been omitted or because of accident damage, then a resistance will effectively be placed in parallel with the measured resistance of the cell and a characteristic change will take place.

On detecting such a sudden change one or more electrical contactors can immediately be actuated to break the electrical circuit, i.e. to disconnect the high voltage terminal or terminals of the fuel cell stack from the electrical system, thus preventing dangerous situations. Moreover, the fuel cell stack can be shut down, i.e. valves can be actuated to cut of the supply of hydrogen and or atmospheric oxygen to the fuel cell stack to inhibit the generation of electricity and/or the stack can be purged of combustible gases.

In other words, if a tool has been left within the environment of the fuel cell and has caused a short circuit or a ground fault this will immediately result in a change in the measured resistance which will be detected and the appropriate remedial action can be taken, such as activating the contactors to break the electrical circuit and or shut down the stack. That is to say the measured resistance value can be used in a manner analogous to a differential protection system (FI switch).

Moreover, if the cooling system is damaged for some reason, for example such that the flow of coolant is restricted, then this will have an effect on the measured resistance. This can be detected and again a warning signal can be issued or the system can be shut down depending on the severity of the change. Similarly, if a ground connection is missing, or corroded, or has broken or been forgotten, then this will have an effect on the measured resistance and can thus be detected.

Should someone inadvertently add a liquid coolant with incorrect electrical conductivity to the system during servicing or on topping up, then this will also result in a change in the measured resistance value and an appropriate warning signal can be issued, or the fuel cell system can be shut down, if the change in conductivity of the coolant is critical.

It is particularly preferred when the electrical isolation system also includes a circuit for measuring a potential difference between the selected one of said fuel cells and the chassis ground.

The selected one of the fuel cells is preferably the first fuel cell adjacent the stack inlet and or outlet for coolant (but need not be the first fuel cell). The bipolar plate of the first fuel cell closest to the stack inlet and the stack outlet may for example settle at an operating potential difference in the range from +20V to −20 V relative to ground, with this potential difference depending on the conductivity of the coolant, on ground fault currents and on cooling geometry effects. By monitoring this potential difference in addition to the measured resistance it is possible to obtain further information concerning the quality of the electrical isolation of the fuel cell stack and associated electrical system and to improve the analysis of the reasons for changes in the electrical isolation. This enables better evaluation of changes that occur and better decision making in response to such changes.

Thus, the present invention also proposes the use of a combination of a resistance monitoring device which continuously measures and monitors the resistance of the resistive path formed by the coolant and other parasitic resistive isolation paths (referred to as R-ISO between the selected fuel cell and ground) together with a voltage monitoring unit which monitors the voltage across the resistive path from the fuel cell through the passivation layer of the respective cell, across channel areas in the MEA and across coolant flow paths in the fuel cell stack and in the coolant manifold towards the chassis ground (referred to as V-ISO). Preferably the fuel cell in closest contact to the coolant inlet/outlet is selected for the connection to the monitoring circuit.

This makes it possible to realize a control device and to implement an algorithm which is capable of calculating not only a change in resistance but also fault currents flowing along the described coolant path, in particular DC fault currents and low frequency AC fault currents. This fault current can be calculated using Ohms law, i.e., $$I\text{-}ISO = V\text{-}ISO / R\text{-}ISO$$

and makes it possible to compare each of R-ISO, V-ISO and I-ISO against adaptive safety thresholds and to initiate warnings and/or high voltage shut down. This system makes it possible to take account of and supervise coolant deterioration over time, undesired variations in coolant channel geometry, and loss of safety grounding.

The preferred use of a stack coolant scheme with a stack or stack arrangement where a low conductivity coolant enters and exits the stack at the same voltage potential plate, which may, for example, be an end plate of the fuel cell stack or a center tap plate for multiple stack arrangements, makes it possible to form a controlled grounding path. All conductive elements of the coolant circuit that are in contact with the coolant, where the danger exists they might go to hazardous voltage levels in the case of an isolation fault, are connected to the chassis ground and thus grounded safetywise.

The electrical isolation system is preferably laid out in such a way that the resistive path between the selected one of the fuel cells and the chassis ground leads to a measured resistance which is as high as possible. With an arrangement of this kind changes in resistance can be measured sensitively.

Preferred embodiments of the electrical isolation system and method of the invention are set forth in the subordinate claims and will now be described in further detail with reference to the accompanying drawings in which are shown:

DESCRIPTION OF THE PREFERRED EMBODIMENT

Figure 1:
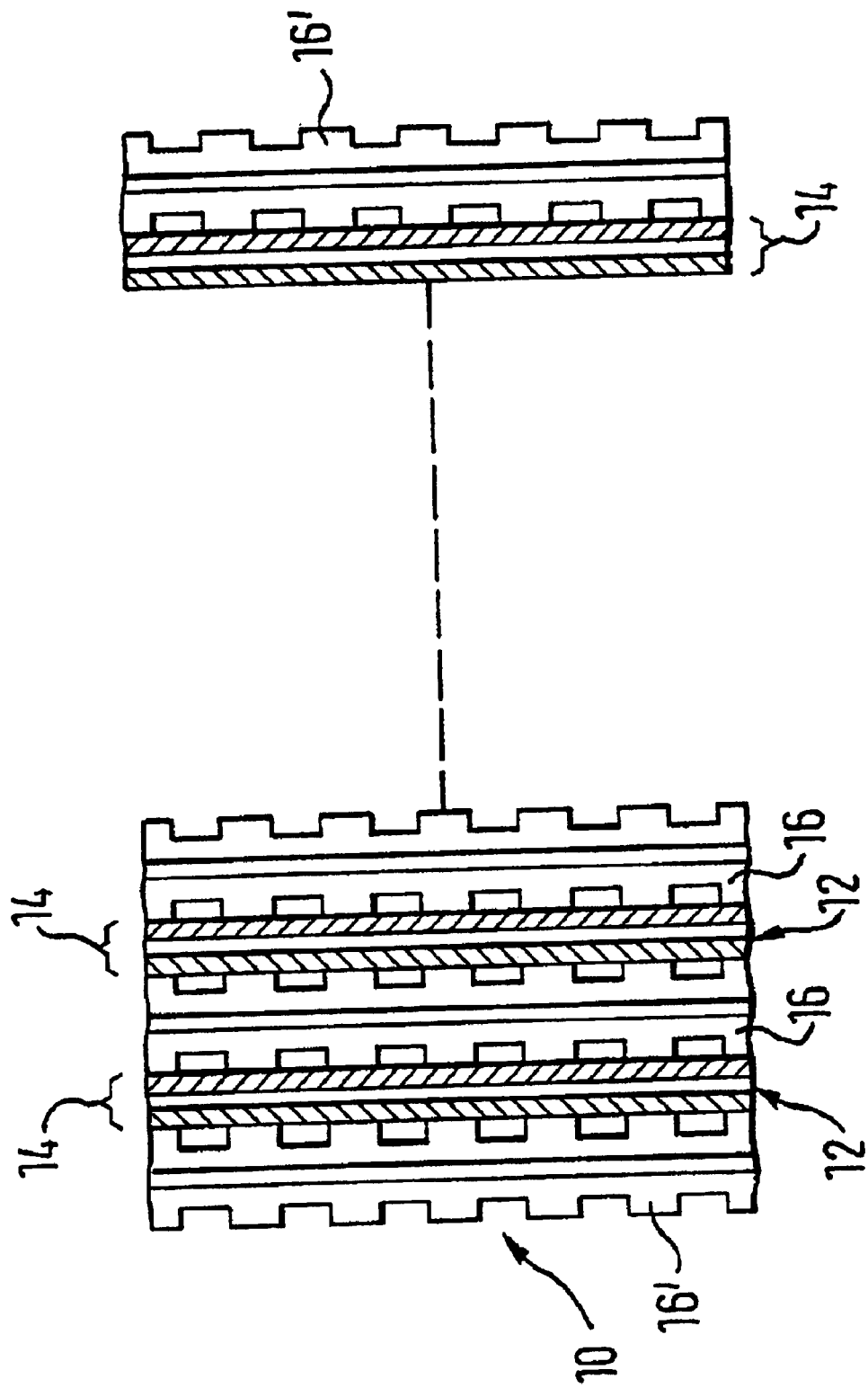
FIG. 1 is a broken away section through two adjacent fuel cells of a fuel cell stack.

FIG. 1 shows a broken away section of a fuel cell stack 10 comprising a plurality of individual fuel cells 12 (of which only two complete cells are shown) which are connected electrically in series. Each fuel cell 12 comprises a so-called MEA 14, which is enclosed between two bipolar plates 16. As can be visualized from FIG. 1, each bipolar plate 16, other than the bipolar plates 16' at the ends of the stack, is present between two adjacent fuel cells. Each bipolar plate 16, 16' has a central coolant passage 17 through which a liquid coolant flows.

Figure 2:
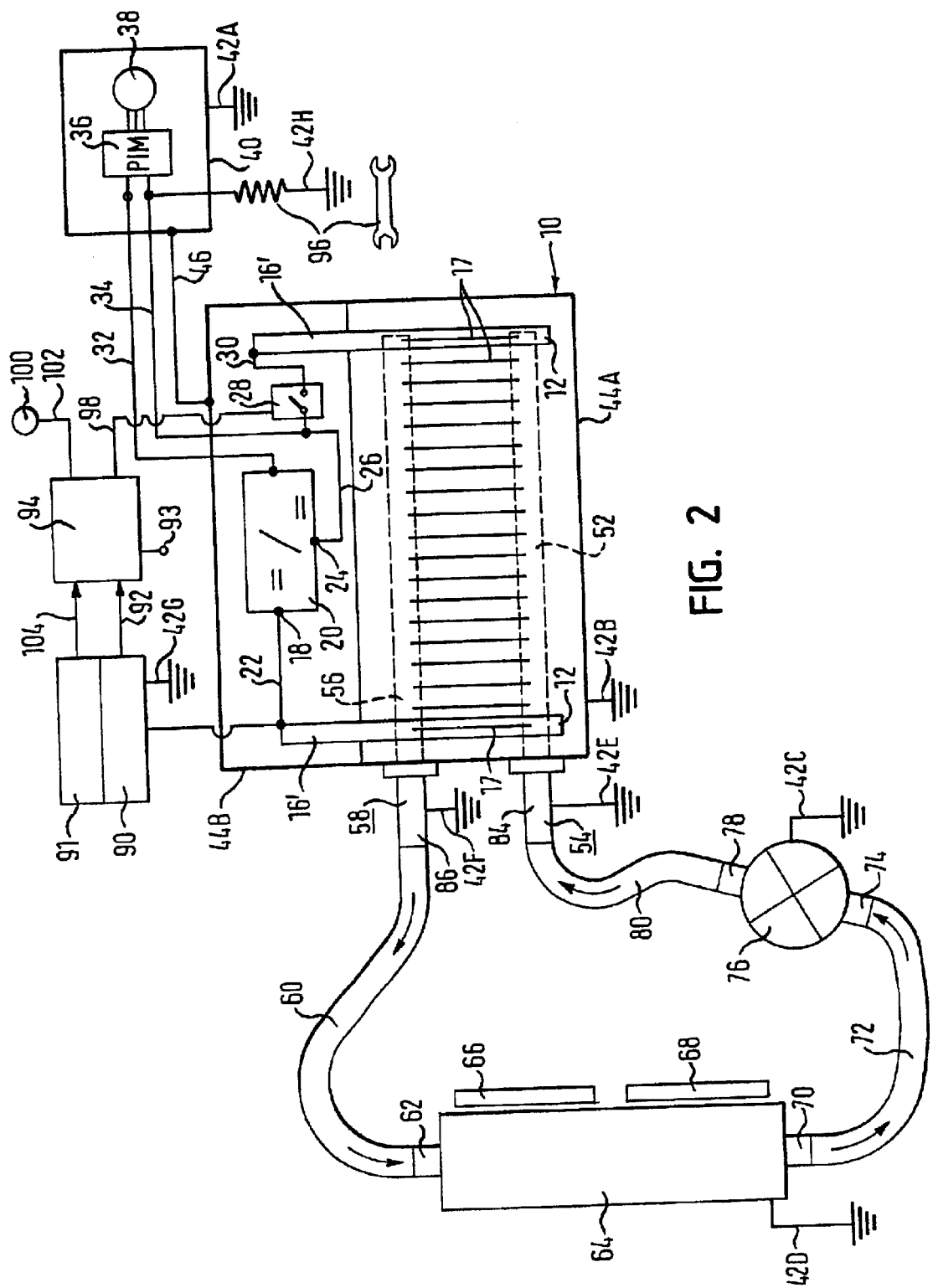
FIG. 2 is a schematic view of an isolation system for a fuel cell stack in accordance with the present invention showing the coolant circuit and the electrical power system of the fuel cell stack, here in the form of a single stack.

Referring now also to FIG. 2, the first bipolar plate 16' of the first fuel cell of the stack has a floating voltage, which may, for example, be 10 V in a typical application. The size of this floating voltage is related to the flow of liquid coolant through the stack and the electrical conductivity of the coolant. It should be noted that all voltages mentioned herein are given purely by way of example and are not to be interpreted as in any way restricting the scope of the invention or claims. The floating voltage is applied to one input 18 of a DC/DC converter 20 via a lead 22. The other input 24 of the DC/DC converter is connected via a lead 26, a contactor 28 and a lead 30 to the last bipolar plate 16' of the fuel cell stack. In the embodiment shown, this last bipolar plate 16' carries a voltage of −175 V. For the sake of simplicity only the first and last bipolar plates 16' of the fuel cell stack 10 are shown in FIG. 2. The positions of the other fuel cells are symbolized by the lines representing the associated coolant passages 17. The potential difference applied to the DC/DC converter 20 in this case is therefore 185 V. The DC/DC converter 20 is designed to provide an output voltage of 200 V on the two output leads 32 and 34 and this output voltage is applied to a power inverter module 36, which supplies power to an electric motor 38 for driving the compressor which supplies compressed air to the fuel cell stack (not shown, but well known per se). The power inverter module 36 is also connected to further AC motors used to drive the vehicle wheels. The power inverter module 36 and the motor 38 as well as other electrical devices connected thereto are all grounded as illustrated schematically by the box 40 and the ground connection 42A. A housing 44A schematically surrounding the fuel cell stack 12 is also connected to ground at 42B and is also connected via the lead 46 to the earthed housing 40 for the power inverter module 36.

As shown in the schematic diagram of FIG. 2, each of the bipolar plates associated with a fuel cell has a cooling passage 17 within it and the cooling passages 17 of all the fuel cells of the stack 12 are connected at one side of the stack to a distributor manifold 52 which receives liquid coolant from a stack inlet 54 and are connected at the other side of the stack to a collection manifold 56 which directs coolant flowing through the bipolar plates 16 to a stack outlet 58. The stack outlet 58 is connected via a flexible hose 60 to an inlet 62 of a radiator 64 with, in this embodiment, two cooling fans 66 and 68. The liquid coolant flowing through the matrix of the radiator 64 is cooled by heat exchange with cool air passing through the matrix of the radiator 64 by the action of the two fans 66 and 68. The liquid coolant emerging from the outlet 70 of the radiator is then directed via a flexible hose 72 to the inlet 74 of a pump 76 which feeds the liquid coolant via an outlet 78 and a further flexible hose 80 to the stack inlet 54. In the drawing of FIG. 2, 42C represents a connection of the metallic body of the pump 76 to the chassis ground and 42D represents a connection of the metallic matrix of the radiator to the chassis ground. In addition, in the embodiment of FIG. 2, the inlet stub 84 forming the inlet 54 to the fuel cell stack 10 is grounded at 42E. Similarly, the metallic outlet stub 86 forming the stack outlet 58 is also grounded at 42F.

Thus, in the arrangement of FIG. 2, the fuel cell stack comprises a plurality of coolant passages 17 for the fuel cells, with the coolant passages being connected here in parallel between the distribution manifold 52 and the collection manifold 56. The cooling circuit comprises: the inlet 54 for feeding the liquid coolant into the stack 10 and into the coolant passages 17, the outlet 58 for removing the liquid coolant from the stack after flow through the coolant passages, the hose 60, the radiator 64 provided as a heat exchanger to cool the liquid coolant and a flow line formed by the flexible hose 72 which connects the radiator outlet 70 to the pump 76, the pump 76 and the flexible hose 80 which connects the pump 76 to the stack inlet 84. Thus, the coolant circuit includes a first flow line formed by the flexible hose 72, the flexible hose 80 and the pump 76 for circulating the liquid coolant in the coolant circuit and a second coolant flow line formed by the hose 60 which connects the stack outlet 58 to the radiator inlet 62. The coolant circuit comprises a plurality of conductive components. These include the outer boundary wall 44A of the fuel cell stack which is typically built up of a plurality of plates and which defines, amongst other things, the distribution manifold 52 and the collection manifold 56 for the flow of the coolant. In similar fashion, the plate construction defines further manifolds (not shown) for the feeding of hydrogen or a synthesized hydrogen-rich gas to the anodes of the fuel cells and for feeding air and thus atmospheric oxygen to the cathodes of the fuel cells. The plate construction similarly defines, in a manner known per se, additional manifolds for conducting the anode exhaust gases and cathode exhaust gases away from the fuel cell stack 10.

In this embodiment, the inlet stub 86 and the outlet stub 84 are metallic components, and they are separately grounded at 42E and 42F. They are not necessarily in direct electrical contact with the plate construction of the fuel cell stack 10 because synthetic-sealing elements may be present between them.

Moreover, as already explained, the conductive body of the pump 76, the radiator 64, any housing 44 which may be present for the fuel cell stack and any housings associated with the electrical system, such as the housing 40 are all connected to a chassis ground. Thus, in this embodiment, all of the conductive components associated with the cool circuit are separately grounded. This is however not essential, it is possible to ground only some or just one of these components. It is however sensible to at least ground a conductive component close to the coolant inlet or outlet of the stack. This automatically ensures that other conductive components further removed from the stack are effectively grounded via the low conductivity coolant. This consideration applies to all possible embodiments of the invention.

In the embodiment of FIG. 2, a resistance measuring circuit 90 is provided which is connected in this embodiment to the first fuel cell 12 of the fuel cell stack, i.e. to the fuel cell closest to the stack inlet 54 and the stack outlet 58 and is connected at its other terminal to the chassis ground as indicated at 42G. The current measurement circuit operates by superimposing an alternating voltage between the chassis ground 42G and the first fuel cell 12 and by measuring the alternating current which flows as a result of the applied alternating voltage. The frequency of the alternating voltage, and thus of the alternating current, may, for example, be approximately 50 Hz. This alternating current does not affect the operation of the fuel cell, but enables the resistance between the first fuel cell and the chassis ground to be measured by using Ohm's Law R-ISO=alternating voltage divided by alternating current.

The chassis ground to which all the ground connections 42A to 42G is made can, for example, be the chassis of a vehicle. The resistance value R-ISO as determined by the circuit 90 is passed, as is schematically illustrated by the arrow 92, to a monitor 94 which effects a comparison between the measured resistance value and at least one predetermined threshold value stored in the monitor 92 or input into the monitor via terminal 93. For example, the monitor 94 can compare the measured resistance value with upper and lower thresholds for the resistance. If the resistance measured lies within these thresholds, then it is assumed that the liquid coolant being used has the correct electrical conductivity.

Should an object such as a tool inadvertently contact the high voltage electrical system, as schematically illustrated at 96, then, irrespective of where the tool touches the high voltage electrical system, a significant change in the measured resistance will be detected. The monitor 94 is arranged to trigger the contactor 28, via the lead 98, to disconnect the electrical system from the high voltage side of the fuel cell, thus preventing dangerous situations due to the tool indicated schematically at 96 and assumed to be in contact with the ground at 42H.

Moreover, should a ground fault develop, as a result of accident damage to the fuel cell system or to the electrical system, this will also result in a change in the measured resistance and can likewise lead to the contactor 28 being disengaged and the fuel cell system shut down. Equally, if the cooling system is damaged, for example due to damage to the fuel cell, or due to one of the flexible hoses 60, 72, or 80 being kinked or otherwise damaged, then this will also lead to a measurable change in the resistance R-ISO and, depending on the severity of the change, the system can either be shut down via the lead 98 or a warning signal can be given via the warning lamp 100 which is also connected to the monitor 94 via the lead 102. The flexible hoses 60, 72 or 80 are typically insulating hoses, but may also include metallic components, such as a reinforcing braid, which should then also be connected to the chassis ground. If a ground fault arises due to failure of a hose then this will also cause a change in resistance, which will be detected by the monitor 94.

It is particularly favorable when, as shown in FIG. 2, a circuit 91 is also provided which is adapted to measure the potential difference between the selected fuel cell 12 and the chassis ground 42G. The corresponding potential difference signal indicated here as V-ISO is passed to the monitor 94, as indicated by the arrow 104. The voltage monitoring circuit preferably also comprises a low pass filter (not shown) in order to eliminate electrical noise from the signal.

Figure 3:
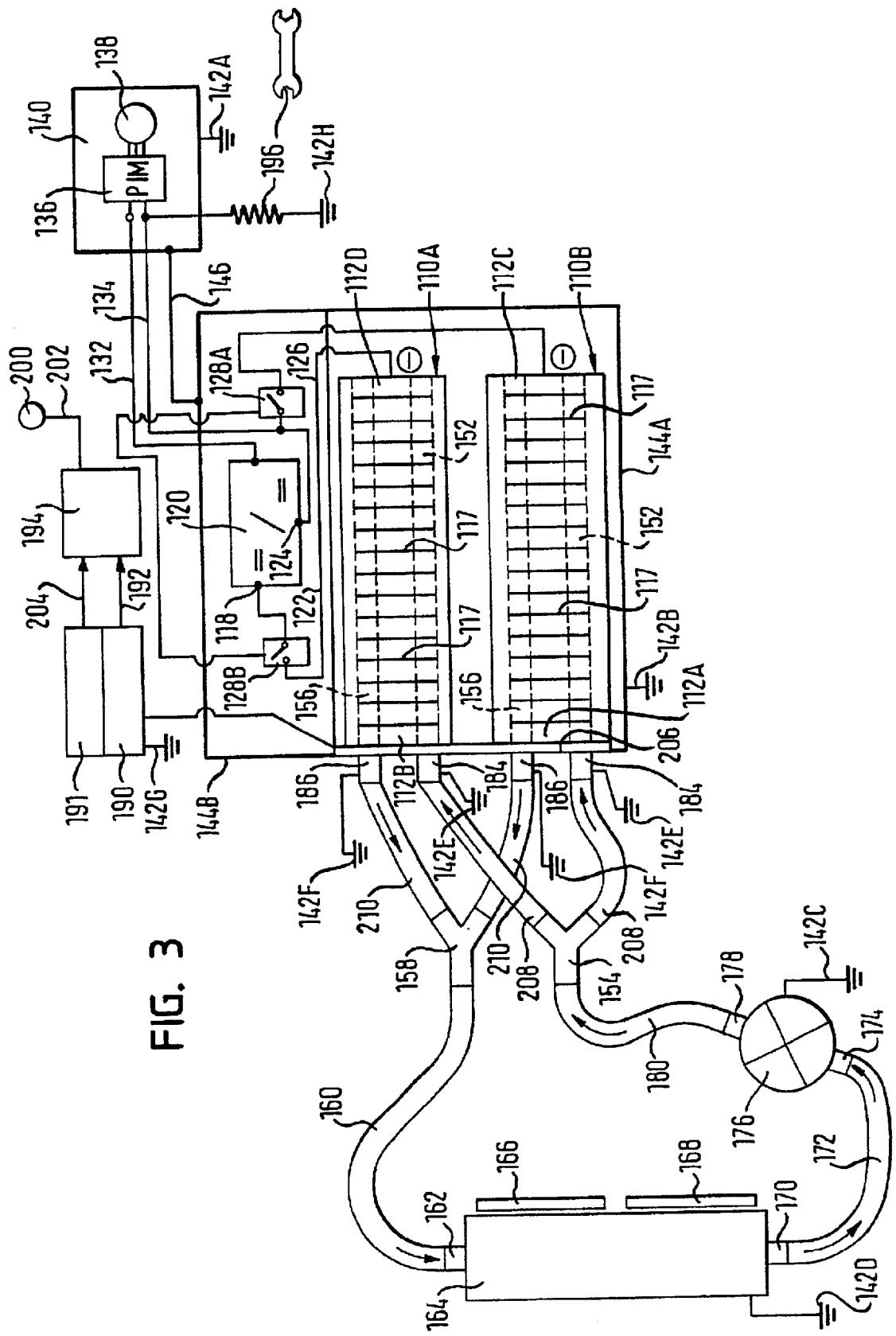
FIG. 3 is a schematic drawing similar to FIG. 2 but of an embodiment in accordance with the invention incorporating a double stack.

FIG. 3 shows a further example of an electrical isolation system for a fuel cell stack in accordance with the present teaching.

The same reference numerals will be used for the discussion of the embodiment of FIG. 3 as have been used in connection with the previous embodiment, but will be increased by the basic number 100 in order to permit a clear differentiation between the embodiments. It will be understood, that the description given of the features of the embodiment of FIG. 1 and FIG. 2 also apply to the components of FIG. 3 having reference numerals with the same last two numbers.

The fuel cell stack 110 of the embodiment of FIG. 3 comprises first and second sub-stacks 110A and 110B which are connected electrically in series but with the sets of coolant passages 17 of the sub-stacks being connected in parallel. Thus, the fuel cell stack inlet 154 feeds each of said coolant passage subsets via respective inlet stubs 184 and the fuel cell stack outlet 158 receives coolant from each of said coolant passage sets via respective outlet stubs 186. The first fuel cells 112A and 112B of each of the sub-stacks are connected electrically together via a metallic plate 206 and the resistance monitoring circuit 190 and the voltage monitoring circuit 191 are connected to the two interconnected first cells 112A and 112B. With the high-voltage stack the metallic plate 206 connecting the first cells 112A and 112B of the sub-stacks 110A and 110B carries a voltage which will typically be between 0 and 10V as in the embodiment of FIG. 1 and FIG. 2. This means that the fuel cell 112C at the opposite end of the sub-stack 110B will have a negative potential of, for example, −175V, whereas the end fuel cell 112D at the corresponding end of the other sub-stack 110A and will be at a positive potential of, for example, +175V.

The electrical system of the embodiment of FIG. 3 corresponds to that of FIG. 1 and is grounded in the same manner. Equally the housing 144A enclosing the fuel cell stacks 110A and 110B of the embodiment of FIG. 3 is grounded as shown 142B and the individual inlet and outlet stubs 184 and 186 are grounded as shown at 142E and 142F respectively. The flexible branch lines 208 connect the stack inlet 154 to the inlet stubs 184 and the flexible branch lines 210 connect the sub-stack outlets 186 for liquid coolant to the chassis stack outlet 158. The flexible hose 180 leads in similar manner to the arrangement of FIG. 2 to the pump 176, which is in term connected by the hose 172 to the radiator 164. The flexible hose 160 returns the liquid coolant from the sub-stacks to the radiator 164. The fault detection is achieved in this embodiment in precisely the same way as for the embodiment of FIG. 2. In this embodiment there are two contactors 128A and 128B to permit interruption of each of the high voltage lines 126 and 122.

Figure 4:
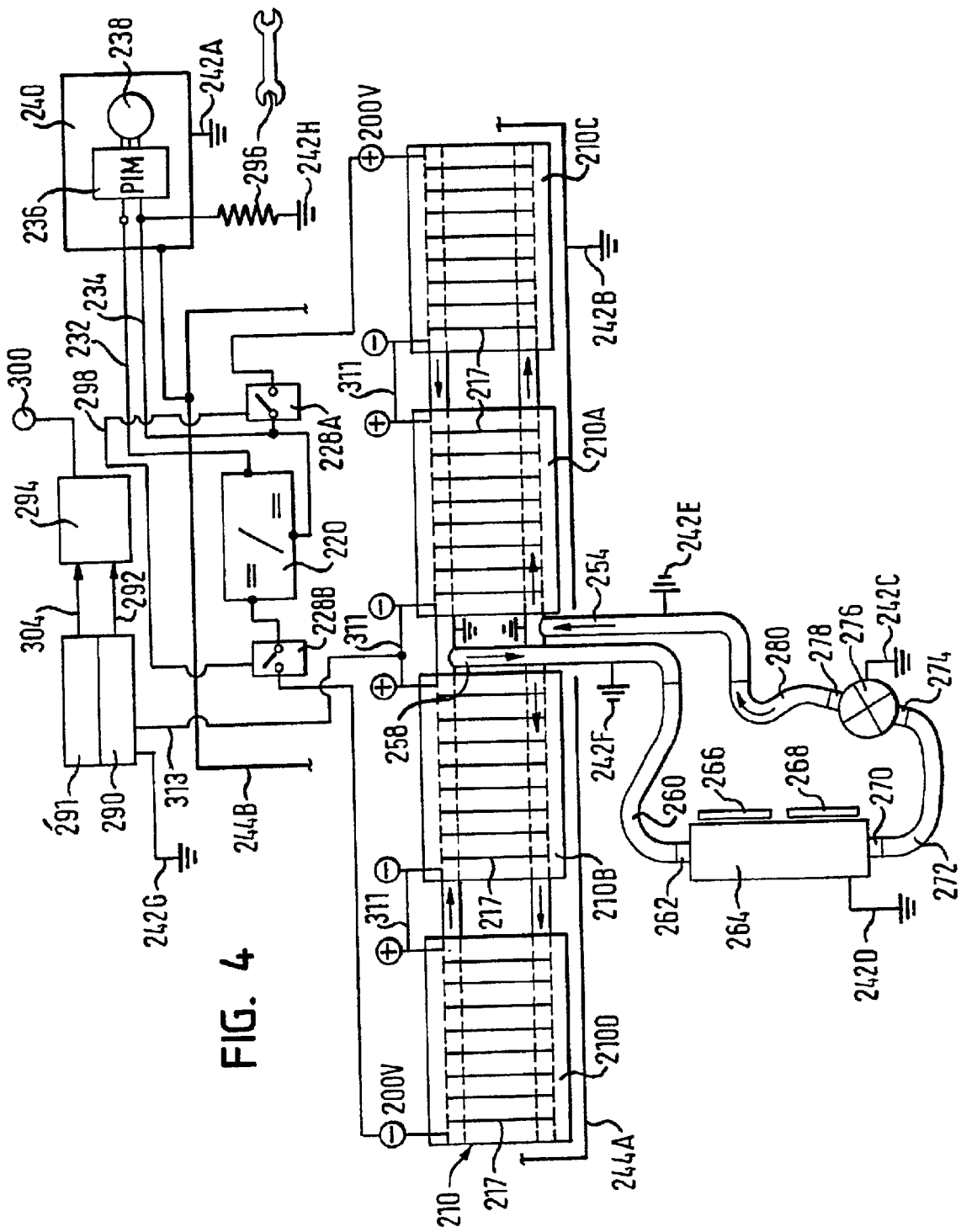
FIG. 4 is a schematic illustration of another embodiment in accordance with the invention of a multiple stack arrangement with an associated cooling system.

FIG. 4 shows a further embodiment of an electrical isolation system for a fuel cell stack in accordance with the present invention. Again the same basic reference numerals will be used as in FIG. 1, but increased by 200 so as to enable the embodiments to be distinguished. Again it is understood that the description given with respect to elements of the previous embodiments also applies to elements of the embodiment of FIG. 4 which have the last two corresponding reference numerals and that elements which have no counterparts in the other figures will be described using new reference numerals.

In the embodiment of FIG. 4, the fuel cell stack 210 comprises the individual sub-stacks 210A, 210B, 210C and 210D. The fuel cells of all four sub-stacks are connected electrically in series, i.e. internally in each sub-stack, with the individual sub-stacks being connected together via leads 311. The circuit monitor 294 is connected via the lead 313 to the adjacent bipolar plates (not shown) of the first fuel cells of each of the sub-stacks 210A and 210B and these bipolar plates have a floating potential typically in the range between 0 and 10V. The fuel cell at the extreme left-hand end of the sub-stack 210D has in this embodiment a potential of −200V, whereas the fuel cell at the extreme right hand end of the sub-stack 210A has a potential of +200V. The stack inlet for liquid coolant is indicated by the reference numeral 254 and the stack outlet is indicated by the reference numeral 258. It can be seen that in this embodiment the cooling passages 217 of all fuel cell sub-stacks 210A, 210C, 210B and 210D are fed with liquid coolant in parallel via the common stack inlet 254 and the common stack outlet 258.

Thus, in this embodiment the circuit monitor 290 is again connected to the fuel cells closest to the stack inlet 254 and the stack outlet 258. The manner of operation of the resistance measuring circuit 290 of the voltage measuring circuit 291 and of the monitor 294 of this embodiment is precisely the same as for the previously described embodiments.

If conductive inlet- and outlet-stubs are used for the fuel cell stack or fuel cell sub-stacks then these should be connected to the chassis ground. However, it can be preferable to make the inlet- and outlet-stubs of a non-conductive material, for example a suitable plastic. The reason for this is that the length of the resistive path to the next grounded element, for example the pump or the radiator, is then increased so that the actual value of the resistance measured is higher and this improves the sensitivity of the measurements that are made.

Figure 5:
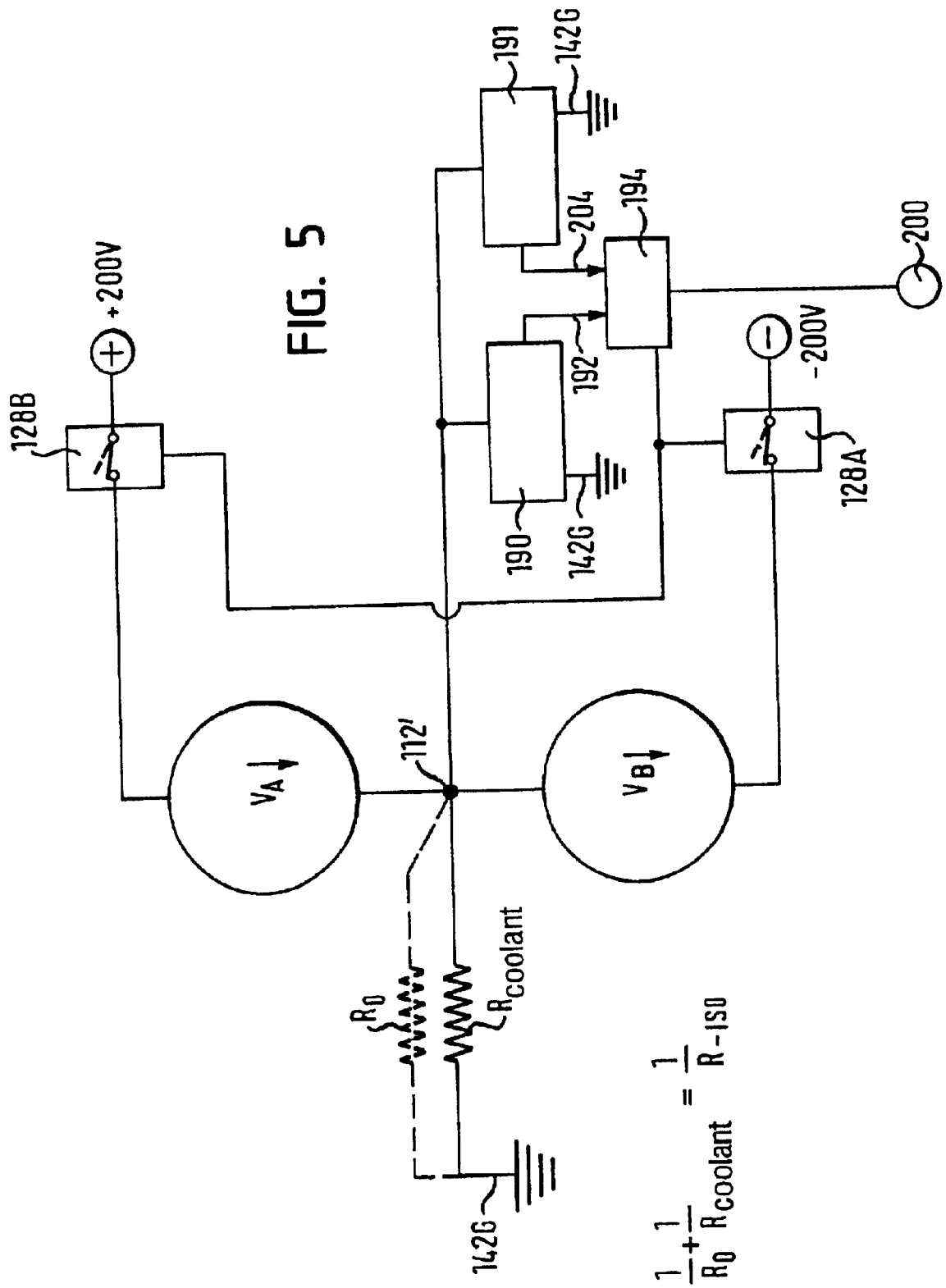
FIG. 5 is a schematic view of an equivalent circuit diagram for the embodiment of FIG. 3.

The equivalent circuit for the monitoring system of FIG. 3 comprising the resistance measuring circuit 190, the voltage measuring circuit 191 and the monitoring circuit 194 is shown in FIG. 5. In the circuit diagram of FIG. 5 the point 112' represents the connection of the monitoring circuit to the selected fuel cells 112A and 112B, i.e. to the connected bipolar plates of these fuel cells. The resistance $R_{coolant}$ represents the resistance that is present between the first fuel cells 112' and the chassis ground 142G. The resistance $R_O$ represents other parasitic resistances which are present between the first fuel cells 112A and 112B and the chassis ground 142G and all resistances are to be considered as arranged in parallel. There is thus an effective resistance R-ISO formed by the resistances connected in parallel between the point 112' and the chassis ground 142G. For a high voltage stack as shown in FIG. 3 the voltage at the point 112' is determined by the voltages $V_A$ and $V_B$ which should nominally be the same but which frequently vary in practice, due amongst other things to (unintentional) physical differences in each of the sub-stacks 110A and 110B and as a result of the rate of flow and conductivity of the coolant in each of the sub-stacks 110A and 110B, each of which is connected to a respective output terminal of the fuel cell stack via a respective contactor 128A, 128B.

Thus the circuit 90 measures the resistance between the first fuel cells 112' and ground, for example by AC current injection and AC voltage measurement. The voltage measuring circuit 191 measures the potential difference between the first fuel cells 112' and ground 142G and typically includes the above mentioned low pass filter (not shown) to eliminate electrical noise.

The algorithm which enables the analysis of the isolation of the electrical system, and which is stored in the circuit monitor 194, can for example be laid out in the following manner. If one assumes that there is a desired fault current detection of 500 Ohms/Volt, then this fault current can be expressed as 2 mA. If the voltage monitor shows an error reading of, for example, 10V magnitude, then the reading produced by the resistance monitor, i.e. R-ISO can be considered as acceptable if it is greater than or equal to $$R\text{-}ISO=10V/2\ mA=5\ k\Omega.$$

That is to say the threshold monitoring values for the voltage monitoring range are, in this example, +10V and −10V. So long as the voltage remains in this range, i.e. between +10V and −10V, the system is deemed to be working acceptably providing R-ISO does not drop below 5 kΩ.

If now a fault develops in say the contactor 128B then the effect of this will be to increase the voltage at point 112' to, say, 12V. Normally the system would now be shut down because this value of +12V lies outside of the permissible range. However, if the measured value of R-ISO is still 5 kΩ then the system controller can, for example, be programmed to allow the stack to keep operating. This means the fault current I-ISO has risen to 12V/5 kΩ=2.4 mA which could be considered acceptable.

In the course of time the resistance of the coolant will typically decrease because of aging effects, electrolysis etc. The resistance could, for example, drop to 4 kΩ. This would mean that the fault current I-ISO is now 12V/4 kΩ=3 mA and this value would no longer be acceptable.

A resistance drop to 4 kΩ with the voltage at point 112' still at 10V (equivalent to a fault current of 2.5 mA) could, however, still be deemed tolerable.

It can be seen from this example that the use of adaptive thresholds for the resistance and the voltage, in particular having regard to permissible fault current values, allows the stack to be operated without being shut down immediately one of the thresholds is exceeded, thus avoiding unnecessary shut downs in practice.

If R-ISO should suddenly fall below 5 kΩ and the potential difference at point 112' rises above 10V then this can be taken as an indication that R-ISO has decreased not due to deterioration of the coolant, but due to some other undesired change in the resistances connected in parallel to the resistance $R_{coolant}$. For example due to a tool illustrated schematically at 196 touching a high-voltage element of the electrical circuit. In either case, a warning signal can be given, and/or the contactors can be disengaged and/or the fuel cell stack can be shut down.

If on the other hand the current monitor shows that R-ISO is greater than 5 kΩ than it would appear, at least initially, that the electrical isolation is functioning correctly. However, as a check, the current I-ISO can than be calculated using the equation I-ISO=V-ISO/R-ISO. If the value of I-ISO is greater than 2 mA then again this is indicative of a fault, such as for example a ground fault and again a warning can be issued, the contactors can be disengaged and the fuel cell system can be shut down.

It should be noted that the present invention is not restricted to specific thresholds. The use of adaptive thresholds makes it possible to prevent unnecessary shut downs of the fuel cell stack.

It should also be noted that the present invention is not restricted to PEM fuel cells, but can basically be used in all known fuel cells, which utilize liquid coolants. Moreover, it is also possible to connect the circuit monitor to a display (not shown), which indicates information such as diagnostic information related to the change in the measured resistance and the measured potential difference.

What is claimed is:

1. An electrical isolation system for a fuel cell stack comprising a plurality of fuel cells connected in series and a coolant circuit for cooling said fuel cells in operation using a liquid coolant having a restricted electrical conductivity, said fuel cell stack being associated with a chassis having a chassis ground and comprising a plurality of coolant passages for said fuel cells, said coolant passages being connected together and said coolant circuit comprising an inlet for feeding said liquid coolant into said stack and into said coolant passages, an outlet for removing said liquid coolant from said stack after flow through said coolant passages, a radiator provided as a heat exchanger to cool said liquid coolant and having an inlet and an outlet, a first coolant flow line connecting said radiator outlet to said fuel cell stack inlet, a second coolant flow line connecting said stack outlet to said radiator inlet and a pump for circulating liquid coolant in said coolant circuit, wherein said coolant circuit comprises a plurality of conductive components, wherein at least one of said conductive components is connected to said chassis ground and wherein a measuring circuit is provided for measuring the resistance between a selected one of said fuel cells and said chassis ground.

2. An electrical isolation system in accordance with claim 1, said coolant passages being connected together in one of the following ways: in parallel, in series, partly in parallel and partly in series.

3. An electrical isolation system in accordance with claim 1, said fuel cell stack having an outer boundary wall and said plurality of conductive components comprising at least one of said outer boundary wall, said radiator and said pump.

4. An electrical isolation system in accordance with claim 1, wherein the selected one of said fuel cells is the fuel cell closest to said stack inlet.

5. An electrical isolation system in accordance with claim 1, wherein the selected one of said fuel cells is the fuel cell closest to said stack outlet.

6. An electrical isolation system in accordance with claim 1, wherein bipolar plates are provided between adjacent fuel cells, said bipolar plates physically separating said fuel cells, but providing an electrical connection between them.

7. An electrical isolation system in accordance with claim 6, wherein said measuring circuit is adapted to measure the resistance between one of said bipolar plates and said chassis ground.

8. An electrical isolation system in accordance with claim 2, wherein bipolar plates are provided, said measuring circuit being connected to a bipolar plate at an inlet side of said fuel cell closest to said stack inlet.

9. An electrical isolation system in accordance with claim 3, wherein bipolar plates are provided, said measuring circuit being connected to a bipolar plate at an outlet side of said fuel cell closest to said stack outlet.

10. An electrical isolation system in accordance with claim 1, wherein said resistance measuring circuit is adapted to direct an alternating current between said selected one of said fuel cells and said chassis ground and to effect said resistance measurement using said alternating current.

11. An electrical isolation system in accordance with claim 1, wherein said fuel cell stack has an associated electrical output system, at least one output terminal and a contactor for connecting each said output terminal to said electrical output system and said electrical isolation system further comprises a circuit monitor adapted to receive a value corresponding to said measured resistance, to effect a comparison with at least one pre-selected threshold and to initiate at least one of the following actions: (a) issue a warning, (b) disengage a said contactor, or (c) initiate a shutdown of said stack if said comparison is unfavorable.

12. An electrical isolation system in accordance with claim 1 and comprising a further circuit for measuring a potential difference between the selected one of said fuel cells and the chassis ground.

13. An electrical isolation system in accordance with claim 11, and comprising a further circuit for measuring a potential difference between the selected one of said fuel cells and the chassis ground, said circuit monitor being provided with an algorithm adapted to consider said potential difference in addition to said measured resistance when effecting said comparison.

14. An electrical isolation system in accordance with claim 13, wherein said algorithm is stored in said monitor as a software program.

15. An electrical isolation system in accordance with claim 12, wherein said potential difference measuring circuit comprises a low pass filter.

16. An electrical isolation system in accordance with claim 11 and further comprising at least one of a warning device, a display connected to said resistance measuring circuit to indicate the presence of a fault, a display connected to said resistance measuring circuit to display information concerning the fault, a display connected to said circuit monitor to indicate the presence of a fault and a display connected to said circuit monitor to display information concerning the fault.

17. An electrical isolation system in accordance with claim 11, said fuel cell stack further comprising at least one contactor present in an output lead connected to a high voltage output terminal of said fuel cell stack, at least one of said measuring circuit and said circuit monitor being adapted to disengage said contactor in the event of an unfavorable comparison indicative of a potentially dangerous fault.

18. An electrical isolation system in accordance with claim 1, wherein said fuel cell stack comprises at least first and second sub-stacks each having a respective set of coolant passages, said sub-stacks being connected electrically in series and said sets of coolant passages being connected in parallel, so that said fuel cell stack inlet feeds each of said coolant passage sets and said fuel cell stack outlet receives coolant from each of said coolant passage sets.

19. An electrical isolation system in accordance with claim 1, wherein said fuel cell stack comprises at least one metallic inlet stub forming said stack inlet and at least one metallic outlet stub forming said stack outlet, said at least one metallic inlet stub and said at least one metallic outlet stub being connected to said chassis ground.

20. An electrical isolation system in accordance with claim 1, wherein said fuel cell stack comprises at least one non-conductive inlet stub forming said stack inlet and at least one non-conductive outlet stub forming said stack outlet.

21. An electrical isolation system in accordance with claim 1, wherein at least a part of each of said first coolant flow line connected to said stack inlet and a part of said second flow line connected to said stack outlet are non-conductive.

22. A method of monitoring a fuel cell stack comprising a plurality of fuel cells connected in series and a coolant circuit for cooling such fuel cells in operation using a liquid coolant having a restricted electrical conductivity, said fuel cell stack having an associated electrical output system, at least one output terminal and a contactor for connecting each said output terminal to said electrical output system and being associated with a chassis having a chassis ground, said fuel cell stack further comprising a plurality of coolant passages for said fuel cells, said coolant passages being connected together and said coolant circuit comprising an inlet for feeding said liquid coolant into said stack and into said coolant passages, an outlet for removing said liquid coolant from said stack after flow through said coolant passages, a radiator provided as a heat exchanger to cool said liquid coolant and having an inlet and an outlet, a first coolant flow line connecting said radiator outlet to said fuel cell stack inlet, a second coolant flow line connecting said stack outlet to said radiator inlet and a pump for circulating liquid coolant in said coolant circuit, wherein said coolant circuit comprises a plurality of conductive components and wherein at least one of said conductive components is connected to said chassis ground, the method comprising the steps of measuring a resistance between a selected one of said fuel cells and said chassis ground and effecting a comparison, directly or indirectly, between said measured resistance and at least one threshold value and, in the event of an unfavorable comparison, initiating at least one of the following actions: (a) generation of a warning signal; (b) disengagement of a said contactor connecting a said output terminal of said stack to said electrical system; or (c) shutting down of said fuel cell stack.

23. A method in accordance with claim 22, wherein a potential difference is measured between said selected fuel cell and said chassis ground and wherein a monitor is provided which receives said measured resistance value and said measured potential difference, said monitor containing an algorithm for determining, in dependence on said measured resistance value and said measured potential difference, whether said fuel cell stack is operating satisfactorily or whether a malfunction is present and, in the event that a malfunction is present initiates at least one of the following actions: (a) triggering of a warning signal; (b) disengagement of a contactor connecting a said output terminal of said stack to said electrical system; or (c) shutting down of said fuel cell stack.

24. A method in accordance with claim 22, wherein said malfunction comprises any one of the following:

an incorrect value of the measured resistance indicating that an incorrect coolant has been used;

an incorrect value of the measured resistance indicating that said coolant has deteriorated in use;

an incorrect value of said measured resistance in combination with at least one of an incorrect value of said measured potential difference and of a current value calculated from said measured resistance and said measured potential difference, said change indicating that said fuel cell stack has been damaged, for example that a partial ground fault exists, for example within any one of said fuel cells or within another component, or in an external circuit electrically connected to said fuel cell stack;

an incorrect value of the measured resistance indicating that at least one connection to a chassis ground is defective or not correctly connected;

a change in at least one of said measured resistance in combination with a change in said measured potential difference and of a current value calculated from said measured resistance and said measured potential difference, said change indicating a variation in coolant passage geometry, for example due to an accident, or a kinked hose;

a change in said measured resistance in combination with a change in at least one of said measured potential difference and of a current value calculated from said measured resistance and said measured potential difference, said change indicating a grounding failure;

a change in said measured resistance in combination with a change in at least one of said measured potential difference and of a current value calculated from said measured resistance and said measured potential difference, said change indicating that a ground fault has occurred of a part of the electrical system of said fuel cell or an unintended resistive connection of an electrical circuit connected to said fuel cell has arisen, for example due to the presence of a foreign object, such as a tool, incorrectly placed or left in the environment of said fuel cell stack; or a change in said measured resistance in combination with a change in at least one of said measured potential difference and of a current value calculated from said measured resistance and said measured potential difference, said change indicating that a flexible hose has failed, for example, due to electrical contact between said coolant and an electrically grounded metallic hose component due to leakage.

25. A method in accordance with claim 22 including the further step of activating a warning device in response to said warning signal.

26. A method in accordance with claim 22 including the further step of activating a display in response to said warning signal to display information related to a cause of said unfavorable comparison.

* * * * *